(12) United States Patent
Madhukar et al.

(10) Patent No.: US 9,288,042 B1
(45) Date of Patent: Mar. 15, 2016

(54) SECURELY AND REDUNDANTLY STORING ENCRYPTION CREDENTIALS SYSTEM AND METHOD

(71) Applicant: EMC Corporation, Hopkinton, MA (US)

(72) Inventors: Manish Madhukar, Shrewsbury, MA (US); Jeffrey A. Brown, Shrewsbury, MA (US); Arun Joseph, Morrisville, NC (US); Rahul D. Pradhan, Clinton, MA (US); Jaleel A. Kazi, Nashua, NH (US); Jeffrey A. Blakeslee, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 7 days.

(21) Appl. No.: 14/211,846

(22) Filed: Mar. 14, 2014

Related U.S. Application Data

(60) Provisional application No. 61/782,105, filed on Mar. 14, 2013.

(51) Int. Cl.
*H04L 9/08* (2006.01)
*H04L 9/00* (2006.01)
*H04L 29/06* (2006.01)

(52) U.S. Cl.
CPC .............. *H04L 9/0819* (2013.01); *H04L 9/08* (2013.01); *H04L 63/062* (2013.01)

(58) Field of Classification Search
CPC ............................. H04L 9/08; H04L 63/062
USPC ................................ 380/279, 278, 44
See application file for complete search history.

(56) References Cited

U.S. PATENT DOCUMENTS

| | | | |
|---|---|---|---|
| 2009/0300309 A1* | 12/2009 | Miyachi et al. | 711/165 |
| 2010/0088525 A1* | 4/2010 | Ureche et al. | 713/193 |
| 2012/0191922 A1* | 7/2012 | Monnie et al. | 711/150 |
| 2013/0058484 A1* | 3/2013 | Delagrange et al. | 380/255 |
| 2013/0174264 A1* | 7/2013 | Chan et al. | 726/26 |
| 2014/0025944 A1* | 1/2014 | Maletsky et al. | 713/150 |

* cited by examiner

*Primary Examiner* — Aravind Moorthy
(74) *Attorney, Agent, or Firm* — Brian J. Colandreo; Mark H. Whittenberger; Holland & Knight LLP (57) ABSTRACT

A method, computer program product, and computing system for generating, by a computing device, a key, wherein the key includes at least one of an encryption key and an authentication key. One or more credentials may be generated to access a Secure KeyStore storing the key, wherein the one or more credentials may include one or more stable system values, and wherein the one or more stable system values may include one or more virtual values and one or more hardware values. The one or more stable system values may be provided to the Secure KeyStore to retrieve the key.

20 Claims, 4 Drawing Sheets

SECURELY AND REDUNDANTLY STORING ENCRYPTION CREDENTIALS SYSTEM AND METHOD

RELATED CASES

This application claims the benefit of U.S. Provisional Application No. 61/782,105, filed on 14 Mar. 2013, by Pradhan et al., the contents of which are all incorporated by reference.

BACKGROUND

Data Security, such as securing data at rest in a storage infrastructure and protecting against drive loss and theft, may be important for many reasons. However, the security provided by any data encryption technology may only be as good as the encryption credentials used to encrypt the data. For example, if the encryption key is not securely managed, the data may be at risk of being compromised. Losing or corrupting the key may lead to disastrous consequences resulting in a data unavailable/data loss scenario. Hence, it may be beneficial to securely store the encryption keys while still making them highly available when needed.

Summary of Disclosure

In one implementation, a computer-implemented method may include generating, by a computing device, a key, wherein the key includes at least one of an encryption key and an authentication key. One or more credentials may be generated to access a Secure KeyStore storing the key, wherein the one or more credentials may include one or more stable system values, and wherein the one or more stable system values may include one or more virtual values and one or more hardware values. The one or more stable system values may be provided to the Secure KeyStore to retrieve the key.

One or more of the following features may be included. The one or more virtual values may be randomly generated. The one or more hardware values may be generated on the fly based upon, at least in part, a value that is constant for a component of storage system hardware. The credentials may be stored in a redundant manner. A mini-RAID engine may be used to verify, rebuild and maintain consistency of each copy of the credentials in the redundant manner. Removal of at least one of the storage devices storing at least one copy of the credentials may be monitored. Access may be provided via a synchronized access.

In another implementation, a computer program product resides on a computer readable medium and has a plurality of instructions stored on it. When executed by a processor, the instructions cause the processor to perform operations that may include generating a key, wherein the key includes at least one of an encryption key and an authentication key. One or more credentials may be generated to access a Secure KeyStore storing the key, wherein the one or more credentials may include one or more stable system values, and wherein the one or more stable system values may include one or more virtual values and one or more hardware values. The one or more stable system values may be provided to the Secure KeyStore to retrieve the key.

One or more of the following features may be included. The one or more virtual values may be randomly generated. The one or more hardware values may be generated on the fly based upon, at least in part, a value that is constant for a component of storage system hardware. The credentials may be stored in a redundant manner. A mini-RAID engine may be used to verify, rebuild and maintain consistency of each copy of the credentials in the redundant manner. Removal of at least one of the storage devices storing at least one copy of the credentials may be monitored. Access may be provided via a synchronized access.

In another implementation, a computing system including a processor and memory is configured to perform operations that may include generating a key, wherein the key includes at least one of an encryption key and an authentication key. One or more credentials may be generated to access a Secure KeyStore storing the key, wherein the one or more credentials may include one or more stable system values, and wherein the one or more stable system values may include one or more virtual values and one or more hardware values. The one or more stable system values may be provided to the Secure KeyStore to retrieve the key.

One or more of the following features may be included. The one or more virtual values may be randomly generated. The one or more hardware values may be generated on the fly based upon, at least in part, a value that is constant for a component of storage system hardware. The credentials may be stored in a redundant manner. A mini-RAID engine may be used to verify, rebuild and maintain consistency of each copy of the credentials in the redundant manner. Removal of at least one of the storage devices storing at least one copy of the credentials may be monitored. Access may be provided via a synchronized access.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
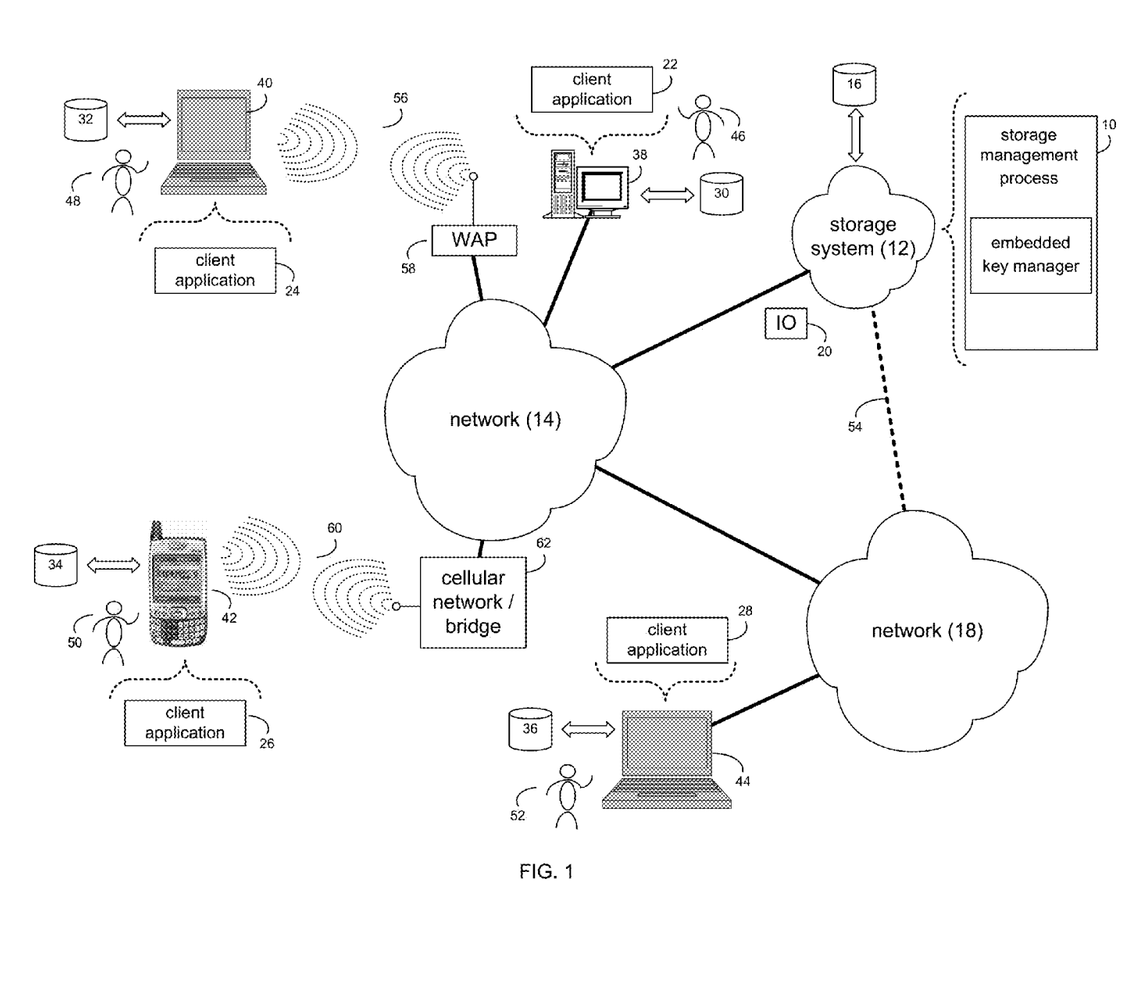
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
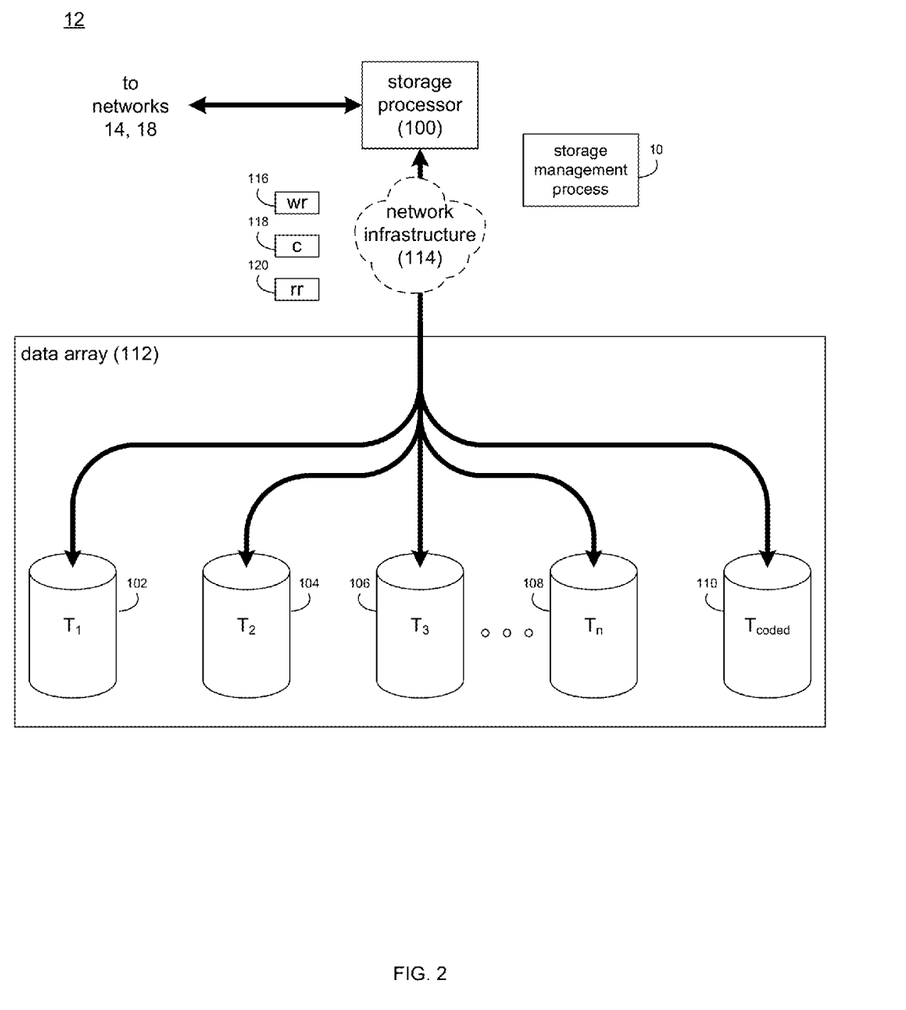
FIG. 2 is a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network. It will be appreciated that implementations may also include using internal (back end), e.g., SAS, based connectivity to the storage devices.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Data Security, such as securing data at rest in a storage infrastructure and protecting against drive loss and theft, may be important for many reasons. However, the security provided by any data encryption technology may only be as good as the encryption credentials used to encrypt the data. For example, if a key (e.g., an encryption/authentication) key is not securely managed, the data may be at risk of being compromised. Losing or corrupting the key may lead to disastrous consequences resulting in a data unavailable/data loss scenario. Hence, it may be beneficial to securely store the keys while still making them highly available when needed.

As will be discussed in greater detail, unlike other approaches for key management, which may involve an external key manager requiring additional hardware to be setup and available to the system in order to access the keys, in order to protect and securely manage the lifecycle of the key (or in an example scenario of the Controller-based or drive-based Encryption of the key itself), a feature (e.g., a Data-at-Rest Encryption (D@RE) feature) of storage management process 10 may incorporate an Embedded Key Manager (EKM) process. The EKM may be responsible for, e.g., generation, secure storage, retrieval, backup and restoration of the key.

As such, storage management process 10 may not require user interaction to securely and redundantly manage the keys. Moreover, storage management process 10 may not require any external component to manage the keys, reducing the need for key management servers, thus reducing the total cost of ownership. Additionally, since access to the key is not dependent on an external key source, the key may be used in dark sites or in remote locations, such as submarines and remote vehicles where access to the key server may not be always feasible. Moreover, EKM process of storage management process 10 may include a self-healing feature that may detect the corruption of the key and automatically restore the key without user interaction on the next system reboot.

The Storage Management Process:

As discussed above and referring also at least to FIGS. 3-4, storage management process 10 may generate 300, by a computing device, a key, wherein the key includes at least one of an encryption key and an authentication key. Storage management process 10 may generate 302 one or more credentials to access a Secure KeyStore storing the key, wherein the one or more credentials may include one or more stable system values, and wherein the one or more stable system values may include one or more virtual values and one or more hardware values. Storage management process 10 may provide 304 the one or more stable system values to the Secure KeyStore to retrieve the key.

Figure 3:
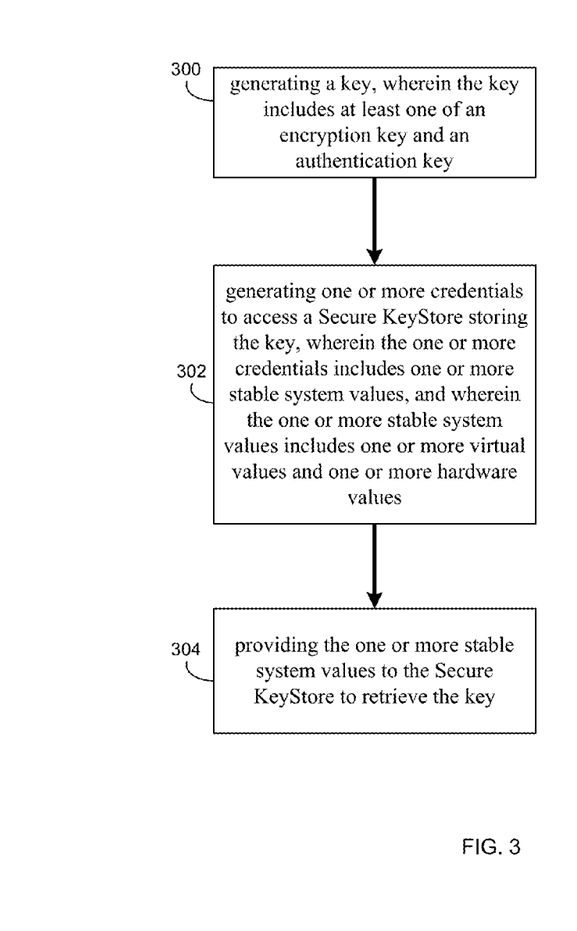
FIG. 3 is a flow chart of one implementation of the storage management process of FIG. 1.

As discussed above, storage management process 10 may generate 300, by a computing device, a key, wherein the key includes at least one of an encryption key and an authentication key. For instance, assume for example purposes only that data stored in storage device 16 is to be encrypted. In the example, storage management process 10 may generate 300 an encryption key that may be used to encrypt the data. It will be appreciated that the encryption key may be generated 300 using known techniques without departing from the scope of the disclosure.

Figure 4:
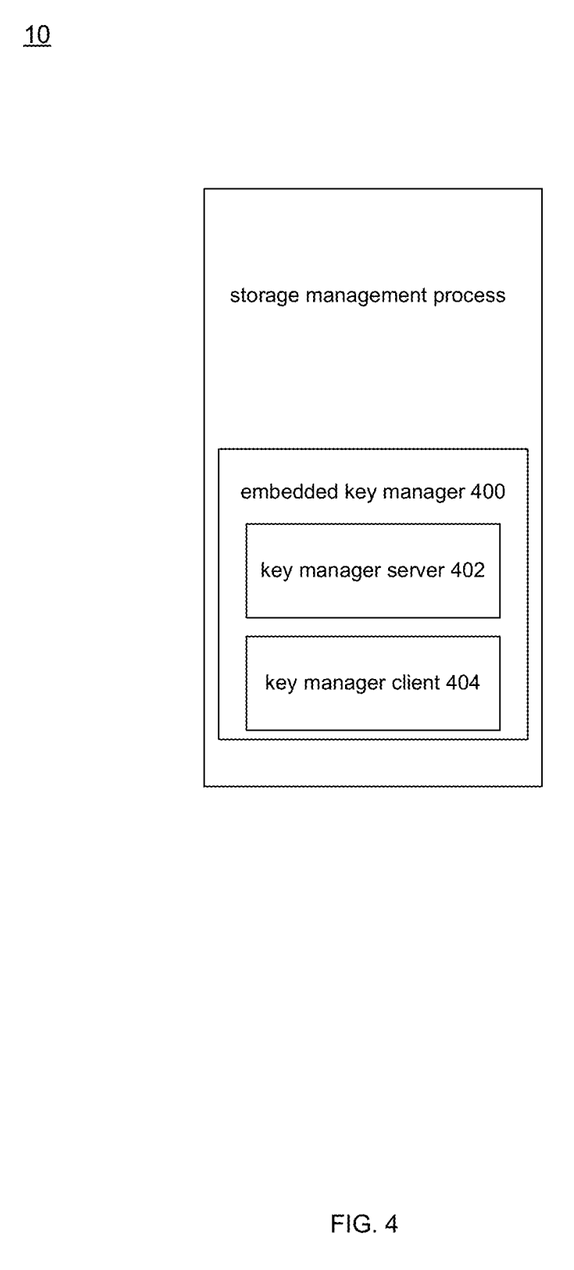
FIG. 4 is a diagrammatic view of the storage management process of FIG. 1.

In some implementations, storage management process 10 may generate 302 one or more credentials to access a Secure KeyStore storing the key, wherein the one or more credentials may include one or more stable system values, and wherein the one or more stable system values may include one or more virtual values and one or more hardware values. In some implementations, the one or more virtual values may be randomly generated 302, and the one or more hardware values may be generated 302 on the fly based upon, at least in part, a value that is constant for a component of storage system hardware (e.g., storage array). Other hardware values may be generated 302 based upon, e.g., two or more components that are seldom simultaneously replaced in the array hardware (e.g., of the array storing the data, the keys, credentials, etc.). For example, embedded key manager (EKM) process 400 of storage management process 10 may include a key manager server (KMS) 402. KMS 402 may provide access control to the Secure KeyStore by enforcing a system fingerprint at the time of the generation 300 of the authentication/encryption key and using that with one or more randomly generated 302 stable system values to associate with that authentication/encryption key. In the example, any access to the encryption key to decrypt the data should provide those system values, and any access to the authentication key to authenticate with the Self-Encrypting Drives should provide those stable system values. The above-noted hardware specific values may be generated 302 on the fly to ensure that no tampering has occurred. In some implementations, if more than one of the hardware values has changed, then the key stored in the encrypted store (e.g., Secure KeyStore) may not be accessible. This may prevent someone from stealing all the storage devices (e.g., drives on an array), inserting them in another array and getting access to the data.

In some implementations, storage management process 10 may provide 304 the one or more stable system values to the Secure KeyStore to retrieve the key. For example, the above-noted stable system values may form a hybrid list of stable system values used to control access to the Secure KeyStore contents (and thus the key). In the example, three of the stable system values may be generated 302 and derived from the current hardware and the rest may be generated 302 randomly.

In the above example, neither the real (e.g., hardware) nor the virtual stable system values provided 304 alone may be sufficient for access to Secure KeyStore contents. In the example, to access the encrypted store (e.g., Secure KeyStore) of the key, KMS 402 may retrieve the virtual stable system values. KMS 402 (via storage management process 10) may then provide 304 the virtual stable system values to the Secure KeyStore along with the hardware stable system values generated 302 on the fly as credentials to unlock to Secure KeyStore to retrieve the key. In some implementations, splitting between randomly generated stable system values and hardware stable system values may enable multiple hardware component replacements. For example, the Secure KeyStore may be self-healing in that, e.g., 1-2 (or more depending on the implementation) hardware component replacements may result in the generation by storage management process 10 of a new set of stable system values during re-authentication.

In some implementations, the credentials may be stored in a redundant manner (e.g., a triple mirrored partition, quadruple mirrored partition, RAID algorithms, etc.). In some implementations, a mini-RAID engine may be used to verify, rebuild and maintain consistency of each copy of the credentials in the redundant manner. For example, KMS 402 (via storage management process 10) may run a mini-RAID like engine in order to triple mirror the key, validate its consistency and rebuild the key if necessary. Additionally, KMS 402 (via storage management process 10) may maintain metadata and calculate a checksum on the Secure KeyStore area to keep track of the consistency of the (three copies) of the key, as well as to identify the need to rebuild the Secure KeyStore area stored, e.g., on backend persistent storage. In some implementations, the key state may be monitored periodically by ensuring that there is access to the key stored in the Secure KeyStore by using the right credentials. For instance, the encryption/authentication credentials may be stored securely in the triple mirrored, encrypted partition, which may require the above-noted known values associated with the hardware at the time of the key creation to access the key.

In some implementations, removal of at least one of the storage devices storing at least one copy of the credentials may be monitored. For example, KMS 402 (via storage management process 10) may track the removal and insertion of the persistent storage devices (e.g., drives in the first three slots) and may rebuild them as necessary on reserved area on the persistent storage devices where the Secure KeyStore resides. In the example, and as noted above, if the example above-noted triple mirrored master copy of the Secure KeyStore is destroyed or corrupted, KMS 402 (via storage management process 10) may automatically restore (e.g., self-heal) a valid copy at system startup.

In some implementations, access may be provided via a synchronized access (e.g., an active-passive high availability model). For example, EKM 400 may be a highly available software component that may run in an active-passive high availability model. For instance, there may be two (or more) instances of EKM 400 (e.g., one running on each storage processor that may have secure access to the encrypted store). In the example scenario of a failure of one of the storage processors, the other non-failing instance residing on the peer processor may take over the operation, thus preventing any downtime for data access. In some implementations, in addition to the triple mirror, the key may also be stored on persistent storage associated with each of the two storage processors as noted above. In some implementations, the synchronization may be carried out by the EKM by themselves or by depending on external triggers from a component that may ensure synchronized access to the Secure KeyStore.

In some implementations, embedded key manager (EKM) process 400 of storage management process 10 may include a key manager client (KMC) 404. KMC 404 may offer an interface to backup and restore the above-noted key. The key backup operation may be triggered by, e.g., a user, either via a graphical user interface (GUI) or a command line interface (CLI), for example. In some implementations, the backup operation may trigger KMC 404 to communicate with KMS 402 to create a new instance of the above-noted Secure KeyStore protected by a password (e.g., supplied by the user). In the example, KMS 402 may retrieve the key from the primary Secure KeyStore and use it for the newly created backup Secure KeyStore. This backup Secure KeyStore may be saved separately (e.g., off array) in order to provide the capability to restore the key. The restore key operation may be performed by putting both the storage processors in service mode. The user (via management process 10) may run a script (e.g., svc_sed) to start the restore operation. In some implementations, the key lifecycle may be self-managed (via storage management process 10) and is not exposed to the user. In some implementations, the only user action permitted on the key may be to backup it up and restore if needed. In some implementations, the key copies may be synchronized during every transition of the key state.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   generating, by a computing device, a key, wherein the key includes at least one of an encryption key and an authentication key;
   generating one or more credentials to access a Secure KeyStore storing the key, wherein the one or more credentials includes one or more stable system values, and wherein the one or more stable system values includes one or more virtual values and one or more hardware values, wherein the one or more hardware values are based upon, at least in part, a value that is constant for a component of storage system hardware, wherein generating one or more credentials includes splitting between virtual values and hardware values to enable replacement of the component; and
   providing the one or more stable system values to the Secure KeyStore to retrieve the key.

2. The computer-implemented method of claim 1 wherein the one or more virtual values are randomly generated.

3. The computer-implemented method of claim 1 wherein the one or more hardware values are generated on the fly.

4. The computer-implemented method of claim 1 wherein the credentials are stored in a redundant manner on one or more storage devices.

5. The computer-implemented method of claim 4 wherein a mini-RAID engine is used to verify, rebuild and maintain consistency of each copy of the credentials in the redundant manner.

6. The computer-implemented method of claim 4 further comprising:
monitoring the removal of the one or more storage devices.

7. The computer-implemented method of claim 1 wherein access is provided via a synchronized access.

8. A computer program product residing on a non-transitory computer readable storage medium having a plurality of instructions stored thereon which, when executed by a processor, cause the processor to perform operations comprising:
generating a key, wherein the key includes at least one of an encryption key and an authentication key;
generating one or more credentials to access a Secure KeyStore storing the key, wherein the one or more credentials includes one or more stable system values, and wherein the one or more stable system values includes one or more virtual values and one or more hardware values, wherein the one or more hardware values are based upon, at least in part, a value that is constant for a component of storage system hardware, wherein generating one or more credentials includes splitting between virtual values and hardware values to enable replacement of the component; and
providing the one or more stable system values to the Secure KeyStore to retrieve the key.

9. The computer program product of claim 8 wherein the one or more virtual values are randomly generated.

10. The computer program product of claim 8 wherein the one or more hardware values are generated on the fly.

11. The computer program product of claim 8 wherein the credentials are stored in a redundant manner on one or more storage devices.

12. The computer program product of claim 11 wherein a mini-RAID engine is used to verify, rebuild and maintain consistency of each copy of the credentials in the redundant manner.

13. The computer-implemented method of claim 11 further comprising:
monitoring the removal of the one or more storage devices.

14. The computer program product of claim 8 wherein access is provided via a synchronized access.

15. A computing system including a processor and a memory configured to perform operations comprising:
generating a key, via the processor, wherein the key includes at least one of an encryption key and an authentication key;
generating one or more credentials to access a Secure KeyStore storing the key, wherein the one or more credentials includes one or more stable system values, and wherein the one or more stable system values includes one or more virtual values and one or more hardware values, wherein the one or more hardware values are based upon, at least in part, a value that is constant for a component of storage system hardware, wherein generating one or more credentials includes splitting between virtual values and hardware values to enable replacement of the component; and
providing the one or more stable system values to the Secure KeyStore to retrieve the key.

16. The computing system of claim 15 wherein the one or more virtual values are randomly generated.

17. The computing system of claim 15 wherein the one or more hardware values are generated on the fly.

18. The computing system of claim 15 wherein the credentials are stored in a redundant manner on one or more storage devices.

19. The computing system of claim 18 wherein a mini-RAID engine is used to verify, rebuild and maintain consistency of each copy of the credentials in the redundant manner.

20. The computer-implemented method of claim 18 further comprising:
monitoring the removal of the one or more storage devices.

* * * * *